(12) United States Patent
Cochran

(10) Patent No.: US 6,767,438 B2
(45) Date of Patent: *Jul. 27, 2004

(54) DUAL VOLTAGE CONICAL ECM ELECTRODE

(75) Inventor: Dustin A. Cochran, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 09/874,085

(22) Filed: Jun. 4, 2001

(65) Prior Publication Data

US 2002/0074222 A1 Jun. 20, 2002

Related U.S. Application Data

(60) Provisional application No. 60/208,857, filed on Jun. 2, 2000.

(51) Int. Cl.$^7$ ............................. B23H 3/00; B23H 7/04
(52) U.S. Cl. .............................. 204/224 M; 204/228.3
(58) Field of Search ......................... 204/228.3, 224 M

(56) References Cited

U.S. PATENT DOCUMENTS 6,267,869 B1 * 7/2001 MacLeod et al. ........... 205/688
6,524,451 B1 * 2/2003 Cochran .................. 204/228.3

* cited by examiner

Primary Examiner—Arun S. Phasge
(74) Attorney, Agent, or Firm—Moser Patterson & Sheridan, LLP

(57) ABSTRACT

To groove two regions simultaneously to different groove depths, a dual element/voltage electrode is disclosed. The electrode comprises an outer, cylindrical sheath element and an inner rod element separated by an insulator. Each element operates at a different voltage. The cylindrical element which grooves the conical bearing will, for example, operate at half the voltage of the rod element which grooves the pumping region, thereby achieving twice the groove depth.

15 Claims, 4 Drawing Sheets

DUAL VOLTAGE CONICAL ECM ELECTRODE

CROSS-REFERENCE TO RELATED APPLICATION

This application is based on U.S. Provisional Patent Application Serial No. 60/208,857 filed on Jun. 2, 2000, entitled DUAL VOLTAGE ECM GROOVING DEVICE, invented by inventor Dustin A. Cochran. The priority of this provisional application is hereby claimed.

The invention is useful in forming grooves used in the system described in U.S. Pat. No. 6,524,451 filed Oct. 26, 2000 by Dustin A. Cochran entitled "Dual Conical ECM Grooving Device". This a patent is incorporated herein by reference.

FIELD OF THE INVENTION

The invention pertains generally to the field of fluid dynamic bearings, and more particularly to etching grooves in a hub or sleeve used in a spindle motor to form such bearings.

BACKGROUND OF THE INVENTION

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrust-plate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes along the edges of the grooves. Removing these ridges, for example by polishing or deburring, is often a time consuming and therefore a costly process. Moreover, to avoid lowering yields, great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub, could be made of a softer material, for example brass or aluminum, now all of these components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked to prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photo resists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

As the result of the above problems, electrochemical machining of grooves in a fluid dynamic bearing has been developed as described in the above-incorporated patent application. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into a solution, with the electrolyte as metal ions and form metallic hydroxides. These metallic hydroxide (MOH) molecules are carried away to be filtered out. However, this process raises the need to accurate and simultaneously place grooves on a surface across a gap which must be very accurately measured, as the setting of the gap will determine the rate and volume at which the metal ions are carried away. Even in simple structures, this problem can be difficult to solve. When the structure is the interior surface of a conical bearing, the setting of the gap width can be extremely difficult. Manufacturability issues associated with conical parts often make it difficult to control the diameter of the cones. Therefore, it is almost impossible to make a tool with fixed electrodes that will guarantee a continued consistent work piece to electrode gap. As noted above, the distance is paramount to the accuracy of grooved depth.

The invention resulted from the need to reduce cycle times of the ECM grooving operation of conical FDB components. Further, these components typically have two types of grooves areas, one in the conical regions and one in the nearby cylindrical regions. The cylindrical regions are referred to as the pumping seal. This seal is to pump oil out of the center regions of the hub into the conical areas where the bearing's functionality actually takes place. The pumping region typically has groove depths which are about twice the depth of the conical region; for example, typical pumping regions have a depth of 0.015 mm, whereas the conical regions have groove depths of 0.007 mm. It is very difficult to achieve this vast difference in depth in the same operation. Therefore, it is necessary to separate the ECM steps by doing the cones and cylinders in different operations. This ultimately increases the cost of the grooved components. A method to groove both sections simultaneously would be highly desirable.

The present invention provides a solution to these and other problems, and offers other advantages over the prior art.

SUMMARY OF THE INVENTION

The present invention relates to a method and apparatus for electrochemically etching grooves in a surface of a conical bearing to form a fluid dynamic bearing. More specifically, the apparatus and method are adapted to simultaneously groove separate regions of a hub or sleeve to different depths.

In accordance with one embodiment, the dual cone or single cone work piece is placed inside a pair of locating surfaces so that it is accurately held within a framework defined by these locating surfaces. A electrode is then inserted inside the cone, and is movable within the cone to accurately set the gap between the electrode which will find the groove pattern to be formed on the cone surface. An electrolyte is then pumped through the gap between the cone and the electrode.

In order to reliably establish the grooves on the work piece, it is essential to be able to set the gap between the moving electrode and the interior surface of the conical work piece. According to a preferred embodiment of the present invention, the electrode work piece gap itself is a critical orifice which accurately restrains the flow of electrolyte between the electrode and the work piece, the electrolyte being the essential element in removing material while electric energy is applied across the gap. In order to simplify the present process and make it as easily repetitive as possible, the method used to set the critical orifice is inverted relative to known flow measurement techniques. The electrolyte is provided at a standard flow rate or static pressure to the gap. Then the spacing between the electrode and the work piece surface is varied by moving the electrode to yield a predefined, measurable mass flow. For example, if electrolyte is provided at a given static pressure X to the gap, then the gap is varied until a predetermined flow Y is measured. Once the mass flow Y is measured, then the gap has been accurately set without having any need to measure the gap itself. At this time, the electric current can be applied, for a known time duration and at a known current level, and the depth and quality of the grooves will be automatically established.

In an enhanced approach to groove two regions simultaneously to different groove depths, a dual element/voltage electrode is disclosed. Preferably, the electrode comprises an outer, cylindrical sheath element and an inner rod element separated by an insulator. Each element operates at a different voltage. The cylindrical element which grooves the conical bearing will, for example, operate at half the voltage of the rod element which grooves the pumping region, thereby achieving twice the groove depth.

Other features and advantages of this invention will be apparent to a person of skill in this field who studies the following detailed description of embodiment of the invention given in conjunction with the associated drawings.

BRIEF DESCRIPTION OF THE DRAWINGS

The teachings of the invention can be readily understood by considering the following detailed description in conjunction with the accompanying drawings, in which.

DETAILED DESCRIPTION OF THE PREFERRED EMBODIMENTS

Figure 1:
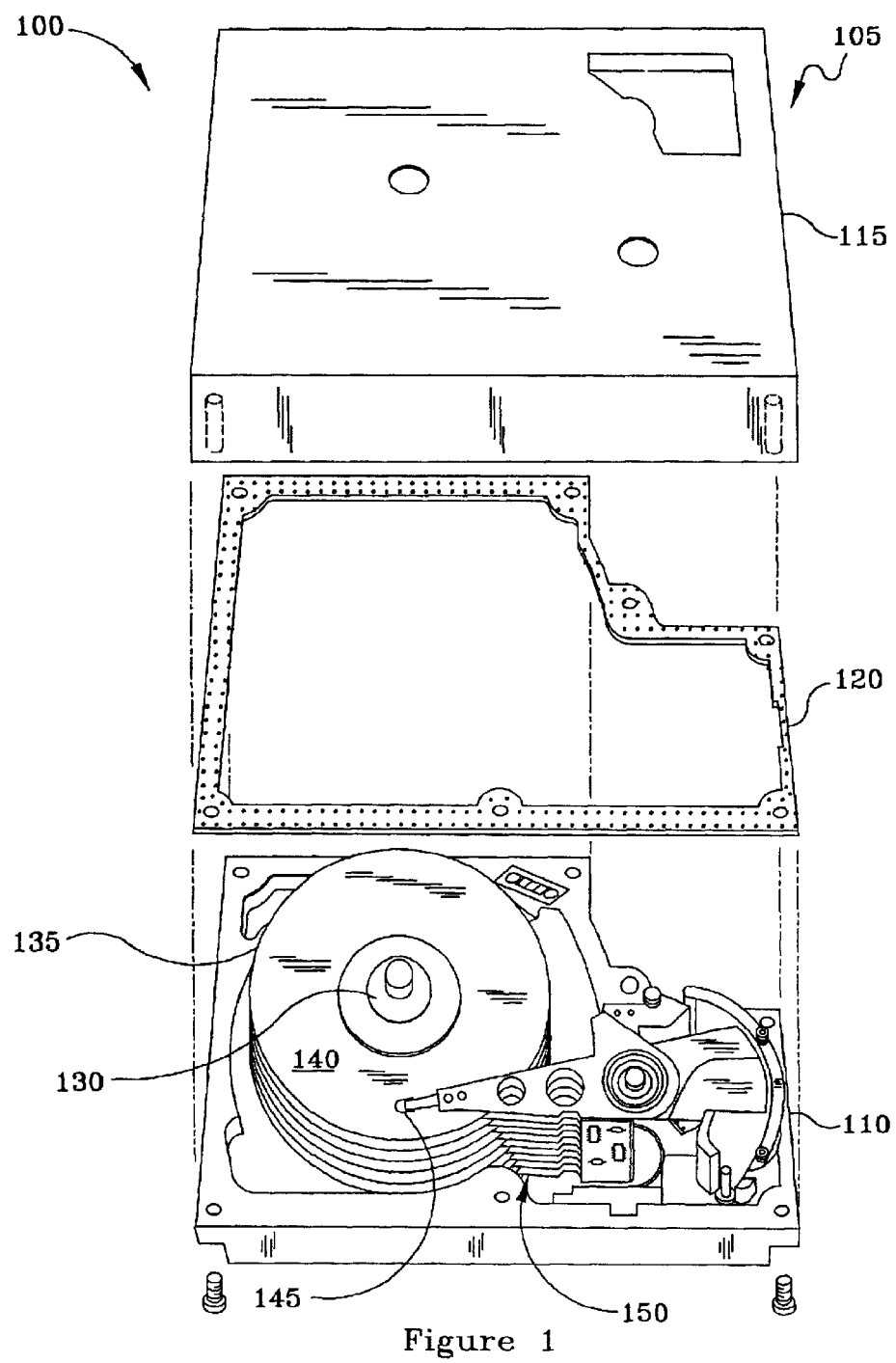
FIG. 1 is an exploded view of a disc drive in which the present invention is especially useful.

FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Figure 2:
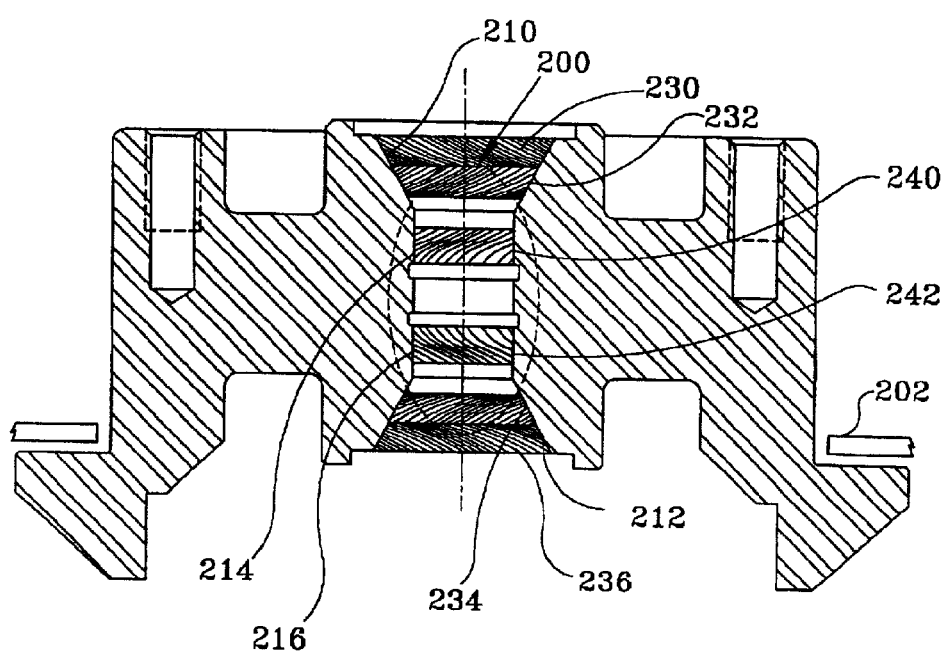
FIG. 2 is a vertical sectional view of a hub utilized in a spindle motor in the disc drive of FIG. 1 showing a dual conical bearing which is of a type which may usefully be formed by the present invention.

FIG. 2 is a vertical sectional view of a hub 200 supported by dual conical and journal bearings for rotation about a shaft (not shown). The hub 200 is integrated with the sleeve whose internal surfaces define the grooves which form the hydrodynamic bearing which supports the hub 200 for rotation. As is well-known in this technology, a shaft (not shown) is inserted within the hub 200 and has dual conical surfaces which face the conical regions 210, 212 at the upper and lower ends of the bearing region. The shaft would further include a smooth center section which would cooperate with the journal bearings defined by the grooved regions 214, 216. As is well-known in this field of fluid dynamic bearings, fluid will fill the gap between the stationary shaft and the inner grooved surfaces of the sleeve. As the sleeve rotates, under the impetus of interaction between magnets mounted on an inner surface of the hub which cooperate with windings supported from the base of the hub, pressure is built up in each of the grooved regions. In this way, the shaft easily supports the hub 200 and disc 202 for constant high speed rotation.

The pressure generating grooves on the inner surface of the sleeve can easily be seen FIG. 2. They include, in the preferred example, two sets of grooves 230, 232 for the upper cone and a corresponding set 234, 236 for the lower cone. This particular design also utilizes two journal bearings 240, 242 to further stabilize the shaft. Obviously, the present invention, which is directed especially to a method and apparatus for making these grooves rather than the design of the grooves themselves, is not limited to making this particular combination of grooved designs. For example, the apparatus and method described could be used to make the grooves inside a single cone or a single cone cooperating with a single journal bearing or dual cones cooperating with one or more journal bearings. Further, each of the conical bearings could have one or more sets of grooves. The principles of the present invention are to be especially applicable in forming any design of conical bearing. The solution provided by this invention is important in defining conical bearings because manufacturability issues associated with conical parts often make it difficult to control the diameter of the cones. Given this, it is extremely hard to make a tool with fixed electrodes that will guarantee a consistent work piece to electrode gap. As described above, this gap distance is paramount to the accuracy of groove depth.

Considering fluid dynamic bearings, the importance of the accuracy of grooves is that a fluid dynamic bearing generally comprises two relatively rotating members having juxtaposed surfaces between which a layer or film or fluid is maintained to form a dynamic cushion an antifriction medium. To form the dynamic cushion, at least one of the surfaces, in this case the interior surface of the hub and sleeve, is provided with grooves which induce fluid flow in the interfacial region and generate a localized region of dynamic high pressure. The grooves are separated by raised lands or ribs and have a depth generally of about 0.009 to 0.015 mm. It is readily apparent that it can be extremely difficult to form grooves having these small dimensions that are relatively closely packed on a surface. To this end, the work piece, which in this case is the hub of FIG. 2, is placed in the grooving device shown in FIG. 3.

Figure 3:
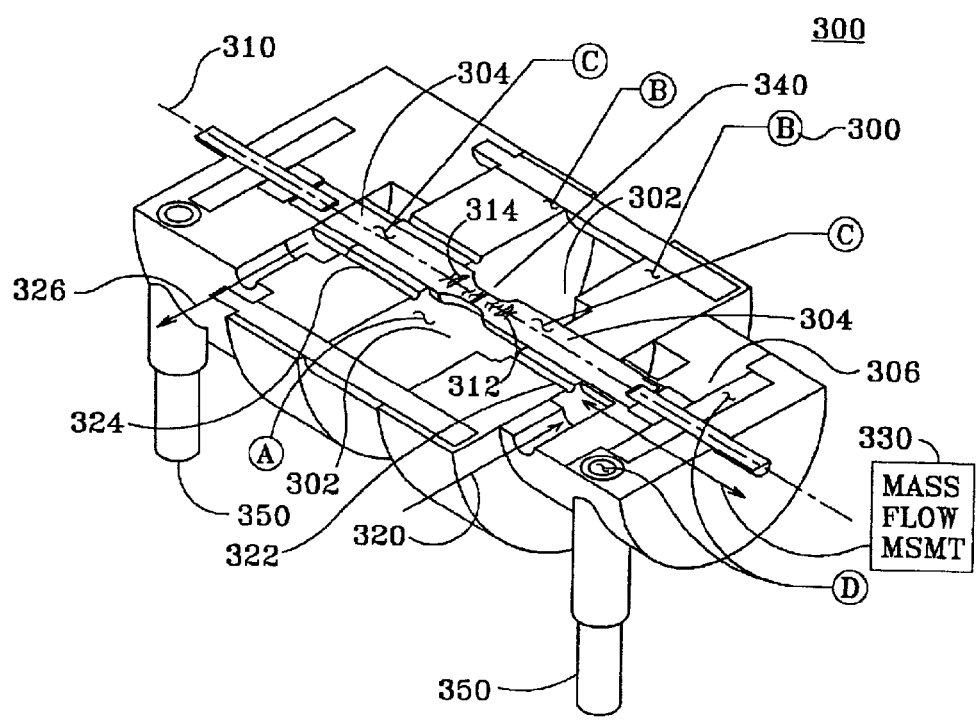
FIG. 3 is a cutaway view of the ECM system of the present invention.

The apparatus for forming grooves using ECM is shown especially in FIG. 3. The work piece of FIG. 2 is placed within the frame 300; as can be seen the frame 300 is configured to define a cavity 302 which has a pair of electrodes 304 running through the center. When the work piece 200 is placed in the cavity 302, it is generally held firmly in place within the edges of the framing pieces 306. The electrodes 304, which are axially movable along axis 310, each include both a conical region 312 which will cooperate with the internal cones 210 and 212 of the hub 200, and a journal region 314 extending from a narrow end of the conical region which will cooperate with the internal hub journals 240 and 242, respectively.

When the work piece 200 is in place in the frame 300, the electrodes 304 are moved back and forth along the axis 310 until the gap between each electrode and the facing surface of the work piece is established. It can be seen, as generally represented in the figure, that each of the electrodes 304 carries the pattern which is to be imposed on the inner surface of the conical 201, 212 and journal regions 214, 216 of the work piece 200. It is also readily apparent that the problem remaining is to accurately set the gap, which must be measured in microns, between the movable electrodes and the work piece 200 which is being held in place in the frame, and to do so quickly and repetitively on a high speed basis. According to the present invention, this measurement can be achieved before the electric current is turned on, by beginning to pump electrolyte through the electrolyte inlet 320. The electrolyte will move through this inlet and the inlet channel 322 and pass between the interior of the work piece or hub 200 and the exterior of the electrode 304, to exit through the exit channel 324 and exit 326. It should, of course, be apparent that the direction of flow is arbitrary. To check the setting of the gap between the electrode and the interior of the work piece, a mass flow measurement device 330 of a type well-known in this field is used. This mass flow measurement device is precalibrated in units to a specific number which represents the setting of the gap. In other words, the electrode/work piece gap is a critical orifice. According to the method practiced herein, electrolyte at a static fixed pressure (which preferably for ease of use is always the same) is applied to the inlet 320 and the inlet gap 322. As the gap between the electrode 304 and the work piece 200 is modified by moving the electrodes, the mass flow measurement will change. By always adjusting the mass flow measurement to a critical target number, the same gap is always defined between the electrode and the work piece surface. Obviously, this method is especially applicable to defining the gap between an electrode conical surface and a work flow conical surface.

Further, it can be seen that this method would typically work best, in the case of a dual conical work piece such as used herein, if the two electrodes are ganged together so that they move axially toward and away from each other. Finally, to prevent fluid loss and a possible small fluid misreading, a sleeve or the like should bridge the gap 340 between the two electrodes which are moving toward each other.

The ECM process can then be executed by then applying an electrical potential to the work piece and electrode, the work piece receiving the positive potential and the electrode serving as the cathode and receiving the negative potential. By timing the current flow, an imprint in the form of the groove pattern shown in FIG. 2 is placed on the work piece. As is well-known, the width and depth of the resulting grooves is controlled by the duration and level of current applied to the work piece 200 and the cathode 304. The current level being modified primarily by the gap which has now been carefully adjusted by other electrolyte parameters.

The axial adjustment of the electrodes 304 is achieved preferably by a worm and gear arrangement 350 shown at either end of the frame and of a type well-known in this technology. Such worm and gear arrangements are capable of precise axial movement of the electrodes and, if desired, can be easily gang coupled together.

Other uses, features and advantages of the present invention will become apparent to a person of skill in the art who studies the above invention disclosure. Therefore, the scope of the present invention is to be limited only by the following claims.

Figure 4:
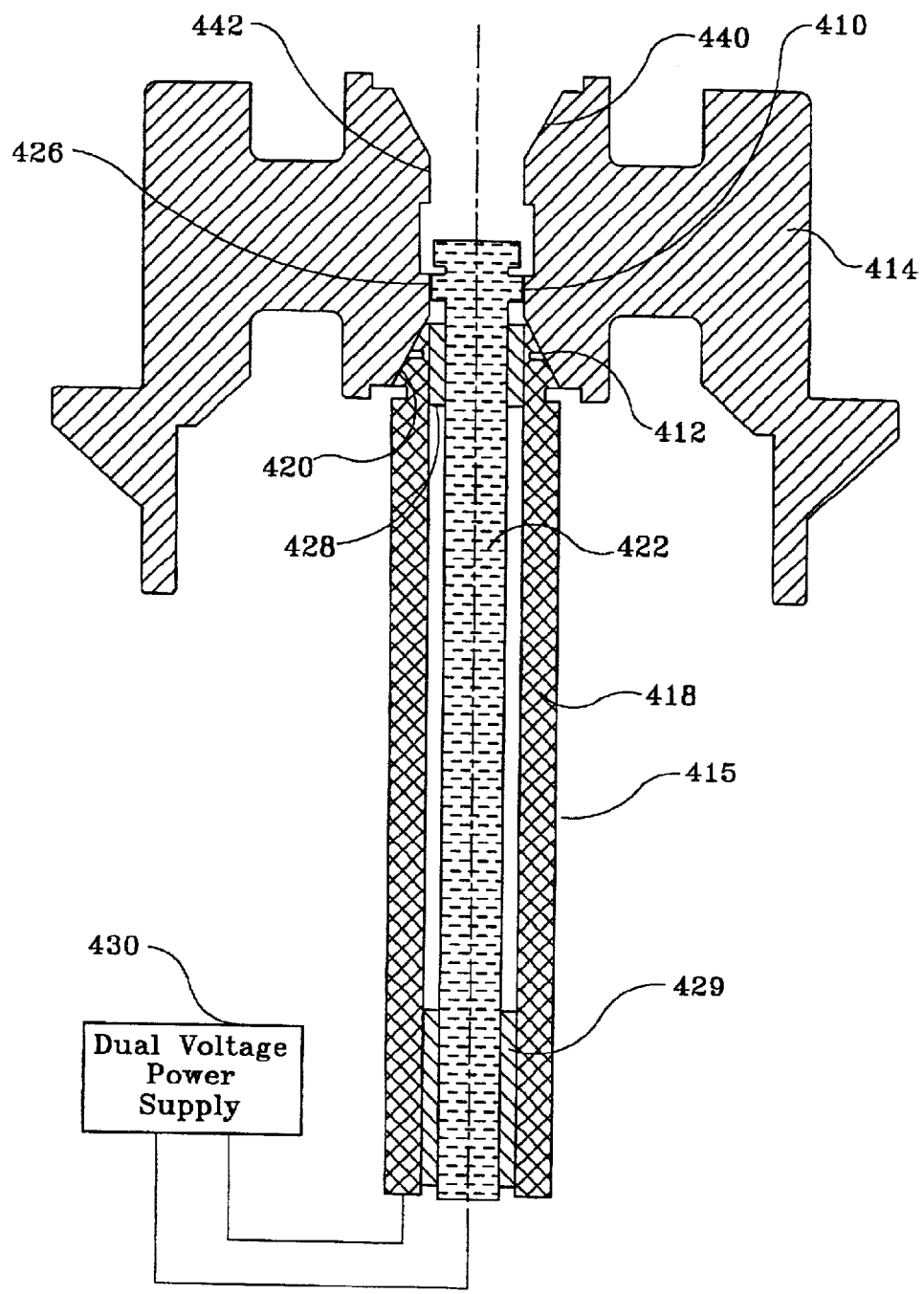
FIG. 4 is a schematic view of an exemplary embodiment of the dual voltage device of the present invention.

FIG. 4 illustrates a modification to the above described method which allows the simultaneous grooving of two different regions to two different depths. Referring specifically to FIG. 4, in this figure we see a method and apparatus for grooving both a cylindrical region 410 and a conical region 412 simultaneously. As described above, and is known from the prior art, the cylindrical region 410 will form the pumping region of a grooved pumping seal; and the conical region 412 will form the grooves 214, 216 of a conical hydrodynamic bearing. In order to achieve the grooving on the inner surfaces of the sleeve 414 which is shown in this figure, a dual element/voltage electrode generally indicated at 415 is utilized. In this electrode 415, the outer electrode is a cylindrical electrode 418 which terminates in a conical region 420 which will face the region towards the inner surface of the sleeve 412 which is to have the grooves which form the conical bearing. A second rod like element 422 is placed inside the cylindrical electrode element 418 and extends beyond the end of the conical working region 420. The end of the rod like electrode element 426 has a groove design which will serve as the working electrode to form the grooves on the inner surface of the pumping region 410 for the grooved pumping seal. The dual electrode elements 418 and 422 are separated one from the other by insulator regions 428 and 429. The insulator may comprise a plurality of separate insulator regions as shown, or one continuous insulator. In operation, the dual element electrode 415 is inserted into alignment with the pumping seal region 410 and conical seal region 412 of the sleeve 14. This insertion of alignment may be accomplished using the apparatus of FIG. 3 described above or other apparatus as long as the necessary alignment is achieved. In a typical grooved pumping seal and conical seal design, the pumping region 410 has a groove depth which is about twice as great the conical region 412. Therefore, each of the electrode elements 418 and 422 should be operated at a different voltage. The rate of material removal is roughly linear function of the voltage applied to the electrode, all other elements of the system being substantially the same. Therefore, a dual voltage power supply will be provided which is capable of supplying different voltages to the two electrodes 418, 422. This dual voltage power supply could be achieved in a number of ways which would be apparent to a person of skill in this field; for example, it could be simply be two separate power supplies making up the power supply 430, with separate outputs to the cylindrical element 418 and the rod element 422. Alternatively, a single power supply could be used, with a high current resistor coupling the output to the conical cylindrical element 418 in order to reduce the voltage by a proportionate amount. Typical operating voltages would be to supply the rod like element which grooves the pumping region with a voltage of about 4 volts, and then provide the cylindrical element 418 with a voltage of about 2 volts. The process described above with respect to FIG. 3 could then be executed. The material will be removed for a measured period of time in order to achieve the desired groove depth of about 0.015 mm in the pumping region 410 and a groove depth of about 0.007 mm in the conical region.

If the system of FIG. 3 is being used, it can be seen that it is desirable to simultaneously groove both the conical region 412 and a similarly configured conical region 440 at the opposite end of a sleeve, as well as both the pumping region 410 and a similarly configured pumping region 442 at the opposite end. In this case, a combination of cylindrical and rod like electrodes could be simultaneously introduced from the opposite end, with the ends of these rod like elements separated by the insulator 340 which is shown most clearly in FIG. 3.

Other features and advantages of this invention will be apparent to a person of skill in the art who studies this disclosure. Therefore, the scope of the invention is to be limited only by the following claims:

What is claimed is:

1. Apparatus for electrochemically etching grooves in a surface of a conical bearing and a grooved journal bearing to be utilized in a fluid dynamic bearing, the apparatus comprising a frame for holding the cone in place about an axis and facing an electrode, movable along that axis, the electrode being axially movable and having separate surfaces carrying separate conical and journal groove patterns;

a source of electrolyte to be pumped through a gap between the surface of the electrode and the inner surface of the cone at a standard flow rate; and a mass flow measurement device for measuring the amount of electrolyte flowing through the gap, and a source of power to provide a voltage to each of the separate surfaces to individually control the rate of groove formation in each of the journal and conical bearings.

2. A device as claimed in claim 1 wherein the electrode comprises first and second elements separately supporting the patterns for the journal and conical bearing.

3. A device as claimed in claim 1 wherein the conical electrode supports a plurality of groove patterns on an outer surface thereof, the plurality of groove patterns being used to form a plurality of groove patterns on the inner surface of the cone.

4. A device as claimed in claim 3 wherein the conical work piece is joined to a shaft, extending from a narrow end of the work piece and wherein the electrode includes a journal section extending from an end of the conical electrode and cooperating with the shaft section of the work piece, the journal electrode supporting a groove pattern to be formed on an interior surface of the journal work piece.

5. A device as claimed in claim 1 wherein the work piece comprises a pair of cones whose narrow ends are joined by a shaft, and wherein the device comprises a pair of electrodes movable relative to the cones toward and away from each other along a common axis which extends through a center of the work piece.

6. A device as claimed in claim 5 wherein the frame supports an element for moving the electrodes toward and away from each other, the electrode moving device being ganged together so that the electrodes move actually toward and away from each other in unison.

7. A device as claimed in claim 1 further comprising a source of electrical potential to be applied to the work piece and the electrode, respectively.

8. A device as claimed in claim 7 wherein the device further includes a control for controlling the duration and level of current applied to the work piece and cathode.

9. Apparatus for electrochemically etching grooves in a surface of a work piece comprising a conical and a journal bearing, the apparatus comprising:

means for fixedly supporting the work piece in the apparatus; and means for locating separate electrodes bearing groove patterns to be etched in the work piece a fixed distance across a gap from the conical surface and journal surface of the work piece.

10. Apparatus as claimed in claim 9 further comprising:

means for supplying electrolyte to the gap and for setting the gap.

11. Apparatus as claimed in claim 9, wherein the means for locating the electrodes also supports the conical work piece.

12. Apparatus as claimed in claim 11, wherein the apparatus further comprises:

a control for controlling the duration and level of current applied to the work piece and electrode.

13. Apparatus as claimed in claim 9, wherein the conical work piece is joined to a shaft extending from a narrow end of the work piece, thereby forming a journal work piece.

14. Apparatus as claimed in claim 9, wherein the work piece comprises a pair of cones having narrow ends joined by a shaft, and wherein the apparatus further comprises a pair of separate electrodes movable relative to the cones toward and away from each other along a common axis which extends through a center of the work piece.

15. Apparatus as claimed in claim 14, wherein the means for fixedly supporting the work piece comprises an electrode-moving device which has an element for moving the pair of separate electrodes toward and away from each other, the electrode-moving device being ganged together so that the pair of separate electrodes move axially toward and away from each other in unison.

* * * * *